United States Patent [19]
Enomoto et al.

[11] Patent Number: 5,935,700
[45] Date of Patent: Aug. 10, 1999

[54] THERMOPLASTIC RESIN FILM CONTAINING COMPOSITE OXIDE PARTICLES

[75] Inventors: Naoyuki Enomoto; Hiroyasu Nishida; Michio Komatsu, all of Kitakyushu, Japan

[73] Assignee: Catalysts & Chemicals Industries Co., Ltd., Tokyo, Japan

[21] Appl. No.: 08/737,937

[22] PCT Filed: Jun. 5, 1995

[86] PCT No.: PCT/JP95/01093

§ 371 Date: Dec. 5, 1996

§ 102(e) Date: Dec. 5, 1996

[87] PCT Pub. No.: WO95/33787

PCT Pub. Date: Dec. 14, 1995

[30] Foreign Application Priority Data

Jun. 6, 1994 [JP] Japan .................................. 6-148622

[51] Int. Cl.⁶ .............................. B32B 27/18; B32B 27/36
[52] U.S. Cl. ........................ 428/330; 428/328; 428/329; 428/331; 428/480; 428/694 ST; 428/694 SL
[58] Field of Search ..................................... 428/323, 328, 428/329, 330, 331, 624 ST, 694 SL, 694 SG, 141, 910, 480

[56] References Cited

U.S. PATENT DOCUMENTS 5,236,622  8/1993  Yoneda et al. .......................... 252/309
5,304,324  4/1994  Yoneda et al. .......................... 252/309
5,316,714  5/1994  Yoneda et al. ........................ 264/210.6

OTHER PUBLICATIONS

CRC Handbook Of Chemistry And Physics (74th Ed.), Jan. 1993, pp. 4–36, 4–88, 4–95, 4–100.

Primary Examiner—Vivian Chen
Attorney, Agent, or Firm—Townsend&Banta

[57] ABSTRACT

A thermoplastic resin film excellent in slipperiness, wear resistance and transparency contains 0.05 to 0.5 wt. % of specified fine particles of composite oxide comprising silica, alkali metal oxide, and at least one inorganic oxide other than silica, wherein the fine particles satisfies the following expression (I):

$$S \geq 10{,}000/(Dp*SG) \tag{I}$$

wherein S indicates the specific surface area ($m^2/g$) of the fine particles of composite oxide, Dp indicates the average diameter (nm) of the fine particles, and SG indicates the true specific gravity thereof. The film is preferably a polyester film having a hazing value of 5% or less. It is suitable for use as magnetic tape, capacitor, photographic film and pressure-sensitive adhesive tape. The film is manufactured by adding a silicate of alkali metals, ammonium or organic bases and an alkali-soluble inorganic compound simultaneously to an alkali solution with pH 9 or above, generating fine particles of composite oxide without any control of the pH of this reaction solution, adding the obtained sol to a thermoplastic resin and/or the reaction system thereof, and processing of a film.

4 Claims, No Drawings

THERMOPLASTIC RESIN FILM CONTAINING COMPOSITE OXIDE PARTICLES

This application is a 371 of PCT/JP95/01093, filed Jun. 5, 1995.

FIELD OF THE INVENTION

The present invention relates to a thermoplastic resin film which is excellent in surface slipperiness, wear resistance, and transparency, and has few rough projections as well as to a method of manufacturing of the same.

BACKGROUND TECHNOLOGY

A thermoplastic resin film is widely used in magnetic tapes, capacitors, for photography and electric insulation, and as a packaging material or the like by utilizing its physically and chemically excellent properties.

Conventionally, there has been known a method in which fine grains of various types of inorganic compound such as silicon dioxide, titanium dioxide, and calcium carbonate or the like are contained in the film in order to improve the surface slipperiness as well as the wear resistance thereof by giving appropriate irregularities to the surface of the film, and a method using particles of silica and calcium carbonate or the like is disclosed in, for instance, Japanese Patent Laid-open Publication No.98729/1986, and a method using a combination of two kinds of silica particles each having a different diameter is also disclosed in Japanese Patent Laid-Open Publication No.284534/1989.

Although the slipperiness (anti-blocking property) and the wear resistance can be improved slightly by these methods described above, the inorganic oxide particles described above have not sufficient adhesiveness and compatibility with the thermoplastic resin such as polyester or the like, so that, when a film is fabricated in a elongation process or other processes similar to that, the separation occurs easily on the interface between the inorganic fine grains and polyester, which causes voids to be generated therein. In the film with the voids, hazing value of the film becomes remarkable, and when it is used as a magnetic tape or the like, the inorganic fine grains easily drop out or are easily cut away due to contact with other materials or with the film itself. For this reason, some dropouts or flaws on the surface thereof are generated as the slipperiness or the wear resistance becomes lower.

On the other hand, in recent years it has been required to make films further thinner in association with the demands for high-density of magnetic recording materials and for more compact size of devices using the same. For that purpose it is indispensable to improve a elongation factor and a elongation speed of the films. However, when a film is made thinner, stress is concentrated onto the interface between the inorganic fine grains and polyester described above. As a result, voids are generated on the interface and furthermore inorganic particles easily drop cut.

As a means to solve the problems described above, there are disclosed a method of processing the surfaces of inorganic particles with a silane compound in Japanese Patent Laid-Open Publication No. 304038/1988, and also a method using particles modified with an isocyanate compound and a water-soluble polyester compound on the surface of the inorganic particles, so called particles with the surfaces reformed, in Japanese Patent Laid-Open Publication No. 309551/1992.

However, even if any of these method have been employed, the adhesion and the compatibility between inorganic particles and polyester are not sufficient, so that the generation of voids thereon is not effectively suppressed, nor are the slipperiness and the wear resistance improved effectively.

DISCLOSURE OF THE INVENTION

It is an object of the present invention to provide a thermoplastic resin film which has only a small number of voids generated and is excellent in the slipperiness, the wear resistance, and the transparency, as well as a method of manufacturing the same.

The thermoplastic resin film according to the present invention contains 0.005 to 20 weight % of fine particles of composite oxide comprising silica and at least one inorganic oxide other than silica, and the particles satisfy the following expression [I]. It should be noted that, in the expression [I], S indicates a specific surface area of fine particles of composite oxide, Dp indicates an average diameter of the fine particles, and S G indicates a true specific gravity thereof.

$$S(m^2/g) \geq 7200/[Dp(nm) \times SG] \quad [I]$$

The thermoplastic resin film is preferably a polyester film.

Hazing value of the thermoplastic resin film is preferably 5% or less.

In the method of manufacturing the thermoplastic resin film according to the present invention, a silicate of alkali metals, ammonium or organic bases and an alkali-soluble inorganic compound are added simultaneously to an alkali solution with pH 10 or more, and a sol prepared by generating fine particles of composite oxide without any control of the pH of this reaction solution is added to a thermoplastic resin and/or the system of reaction therewith for processing of a film.

Seed particles may be dispersed in the alkali solution with pH 10 or more described above. Also, in the method of manufacturing the thermoplastic resin film described above, it is preferable to add a sol, in which fine particles obtained by removing a part of element other than silicon or oxygen from the fine particles of composite oxide are dispersed, to a thermoplastic resin and/or the reaction system thereof.

BEST MODE FOR CARRYING OUT THE PRESENT INVENTION

Description is made hereinafter for the best mode for carrying out the thermoplastic resin film according to the present invention and the method of manufacturing the same.

In the present invention, the thermoplastic resin film is a film prepared by melting and extruding an ordinary thermoplastic resin to mold it into a sheet state and then elongating the sheet into a film. The thermoplastic resin described above includes, for instance, polyethylene, polyprolylene, polystyrene, polymethyl methacrylate, polyvynil chloride, polyvinylidene chloride, polyimide, polyamide, and polyester or the like, and other copolymer or a graft copolymer element may be used as required. It is also preferable to use the so-called multilayered film on which these thermoplastic resins are deposited in a multilayered form, at least one thermoplastic resin which are mixed with each other.

Of these thermoplastics, it is especially preferable to use polyester because it can be used for various purposes such as for a magnetic recording material or the like. The polyester is a polymer having an ester type of repetition unit constituting the principle chain, and is obtained by means of condensation polymerization of various kinds of dicarboxylic acid or derivatives thereof with various kinds of glycol and derivatives thereof. As the component of dicarboxylic acid, for instance, aromatic dicarboxylic acid such as isophtalic acid, 4,4-dicarboxylic diphenyle, 2,6-naphtalene dicarboxylic acid or the like, aliphatic dicarboxylic acid such as adipic acid and sevacic acid or the like, and alicyclic dicarboxylic acid such as cyclohexane-1,4-dicarboxylic acid or the like can be used independently or in the mixed form.

As the component of glycol, alkylene glycol such as ethylene glycol, diethylene glycol, propylene glycol, and butanediol or the like, or the polymer of the alkylene glycol, 1,4-cyclohexane dimethanol, and neopethyl glycol or the like can be used independently or in the mixed form. Polyester in which 80 mol % or more of repetition structural unit of the principle chain consists of tereptithalic acid or 2,6-naphtalane dicarboxylic acid is especially preferable because it is excellent in the chemical as well as dynamic characteristics.

Fine particles of composite oxide (sometimes described as colloidal particles hereinafter) are contained in the thermoplastic resin film according to the present invention, and as the fine particles, colloidal particles based on the composite oxide sol as a material are preferable. The composite oxide constituting the colloidal particles is a composite oxide consisting of silica and inorganic oxide other than silica, and composite oxide comprising silica and inorganic oxide other than silica is especially preferable. The composite oxide has active sites such as a solid base or the like, so that it is preferable because its reactivity and adhesion to the resin are high when the oxide described above is added to the thermoplastic resins described later.

As inorganic oxides other than silica, for instance, oxides of metal or non-metal elements such as the group 1A, group 2A, group 2B, group 3A, group 3B, group 4A, group 4B, group 5A, group 5B, and group 6A in the periodic table can be enumerated, and more specifically, it is desirable to used one or more of $Li_2O$, $Na_2O$, $K_2O$, $Rb_2O$, $BeO$, $MgO$, $CaO$, $SrO$, $BaO$, $ZnO$, $Y_2O_3$, $La_2O_3$, $Al_2O_3$, $Ga_2O_3$, $B_2O_3$, $Ce_2O_3$, $Sb_2O_5$, $P_2O_5$, $TiO_2$, $ZrO_2$, $SnO_2$, $MoO_3$, $WO_3$ or the like.

It is required that the colloidal particles of composite oxide satisfy the expression [I] described above.

The specific surface area(S) of the colloidal particles of composite oxide is measured according to the BET method for samples obtained by drying the colloidal particles of composite oxide under the temperature of 110° C. after the sol is frozen. An average diameter of the particles (D p) is measured by measuring scattering of a laser beam as well as distribution of particle sizes, and a true specific gravity (S G) is measured by measuring a specific gravity of a colloidal aqueous solution according to the method as defined in the JIS Z 8804-1960 and converting the measured specific gravity based on its solid phase to the true specific gravity.

In the present invention, to satisfy the expression of inequality [I], a composite ratio (a mole ratio) of silica to inorganic oxide should preferably be in a range from 0.1 to 20. If this ratio is more than 20, the specific surface area (S) and the pore diameter of the colloidal particles become smaller, and on the other hand, if the ratio is less than 0.1, the specific surface area (S) of the colloidal particles hardly increases, and there will be less generation of pores.

In the present invention, it is desirable that the colloidal particles of composite oxide have spherical shape, and average diameter of the particles (D p) is in a range from 10 to 2000 nm, preferably in a range from 50 to 1000 nm, and more preferably in a range from 100 to 600 nm. When the average diameter of the particles is more than 2000 nm, the hazing value of the film increases, and at the same time projections on the surface of the film become higher in height, and in a case where it is used as a magnetic recording material, the electromagnetic transfer property becomes disadvantageously lower. On the other hand, when it is less than 10 nm, the slipperiness and the wear resistance of the surface on the film are reduced to half of their original values, which is an unexpected result.

It is desirable that the colloidal particles of composite oxide satisfying the expression of inequality [I] described above has large pores with an average diameter thereof of 50 Å or more, preferably 60 Å or more, and more preferably 100 Å or more, and also that they have large specific surface area. Accordingly, it is conceivable that thermoplastic resin enters into the pores of the particles in a step of polymerization of the thermoplastic resin or in a step of mixing the same with the particles, so that the colloidal particles of composite oxide and the thermoplastic resin are combined with each other, which makes it possible to improve the adhesiveness to and compatibility with the resin. And for this reason, generation of voids therein can be suppressed, the transparency maintained, and the colloidal particles can be prevented from dropping out. It should be noted that an average diameter of pores in the colloidal particle can be obtained by preparing a calibration curve between an average diameter of pores and the melting initiation temperature, which was determined with a differential thermal analysis according to the method described in Shimazu Hyouron, Vol.47, No.3, P.307 (1990). Also the same result can be obtained even if it is measured with a pore distribution measuring device in which nitrogen is usually used.

On the other hand, in a case where the expression of inequality [I] above is not satisfied, namely, when the porosity of particles is low, voids can easily be generated near the colloidal particles because the thermoplastic resin can hardly enter into pores of the colloidal particles. In this type of film, hazing value therein is large, and particles easily drop out, so that the desired effect of the present invention can not be obtained. Also the same tendency is shown in a case where pores of the particles have a smaller diameter than the average diameter of 50 Å.

The hazing value of the thermoplastic film according to the present invention is not more than 5%, preferably 3% or less, and more preferably 2% or less. When the hazing value is more than 5%, the film is not sufficiently transparent, so that it is not suitable for purposes such as use as a material for packaging or the like requiring high transparency thereof, which is disadvantageous. To reduce the hazing value of the film, it is indispensable that a difference between a refractive index of the film and that of the colloidal particles contained therein is reduced, and for this reason the refractive index of the colloidal particles of composite oxide may be adjusted so that the difference will be reduced to a range of ±0.10, preferably to ±0.05, and more preferably to ±0.03. As a method of adjusting the refractive index of the colloidal particles, the object can be achieved, for instance, by selecting various kinds of inorganic oxides other than silica described above as required and combining the selected inorganic oxide with the resin. Generally the refractive index of the colloidal particles of composite oxide can be adjusted to a range from 1.42 to 1.80.

A Mohs' hardness of the colloidal particles of composite oxide according to the present invention is normally in a range from 3.5 to 9.

In a case where the thermoplastic resin film is used as a magnetic recording material, demands for high performance and high reliability of the film can not be satisfied unless the film is excellent in such characteristics as moving stability and electromagnetic conversion property and it has a long life with less abrasion of the film as well as of the magnetic head. The film containing therein the fine particles of composite oxide used in the present invention insures high abrasion resistance of the film and that of the magnetic head, so that it is excellent in durability. Although it has not been clearly understood why the film has high abrasion resistance, one of the reasons is, as described above, conceivably that less particles drop out and an apparent hardness of the particles become lower because the particles and the resin are combined with each other as described above, whereby the film and the head are not easily damaged.

In the thermoplastic resin film according to present invention, the content of the colloidal particles of composite oxide is in a range from 0.005 to 20 weight %, and preferably in a range from 0.01 to 5 weight %. When the content thereof is less than 0.005 weight %, the density of projections on the surface of the film becomes lower and the slipperiness and the wear resistance become insufficient because a number of particles in the polymer is too small. On the other hand, when a quantity of added colloidal particles is more than 20 weight %, the excellent characteristics of the thermoplastic resin is lost, and the functionality thereof can not be improved, which is not economical. Dispersion of colloidal particles in the resin may become disadvantageously worse. It should be noted that the thermoplastic resin film according to the present invention can contain therein fine particles of inorganic oxide other than the colloidal particles of composite oxide described above together therewith as required.

Next description is made for a method of manufacturing the thermoplastic resin film according to the present invention, and at first description is made for a method of manufacturing fine particles of composite oxide.

The fine particles of composite oxide can be manufactured, for instance, according to the method of manufacturing a sol disclosed in Japanese Patent Laid-Open Publication No.132309/1993 which is previously filed by the present applicant. Namely a composite oxide sol can be manufactured by adding a silicate of alkali metals, ammonium or organic bases and an alkali-soluble inorganic compound at the same time to an alkali solution having pH 9 or above, and generating colloidal particles without controlling the pH of this reaction solution. Especially, it is preferable to add the inorganic compound described above to the alkali solution with the pH of 9 or above, preferably in a range from pH 9 to pH 12, and more preferably in a range from pH 9 to pH 11, and to generate colloidal particles without controlling the pH of this reaction solution. If the pH is 9 or below, small particles are easily generated, so that the particle size is distributed in a board range, which is disadvantageous.

As the silicates of the alkali metal described above, for instance, sodium silicate (water glass) or potassium silicate is used. As the organic base, for instance, fourth ammonium salt such as tetraethyl ammonium salt or the like, or an amine group such as monoethanol amine, diethanol amine, triethanol amine can be enumerated, and the silicate of ammonium or an organic base includes an alkali solution in which ammonia, fourth ammonium hydroxide, or an amine compound or the like is added. An organosilicon compound such as, for instance, tetraethoxy silane or tetramethoxy silane may be used. Especially, the inorganic compound such as sodium silicate is preferable because it can easily be obtained by an industrial means and also the cost is low.

As the alkali-soluble inorganic compound, alkali metal salt or alkali earth metal salt of metallic or non-metallic oxo acid, ammonium salt, or fourth ammonium salt can be enumerated, and more specifically it is preferable to use any of sodium aluminate, sodium tetraboric acid, zirconia carbonate ammonium, potassium antimony acid, potassium stannic acid, sodium alumino silicon, sodium molybdic acid, sodium tungstic acid, cerium nitrate ammonium, sodium phosphoric acid, sodium zinc acid or the like, and also an alkoxide compound and a chelate compound of these metallic or non-metallic compounds may be used.

The composite oxide sol can also be manufactured according to the method disclosed in Japanese Patent Laid-Open Publication No.132309/1993 described above, by adding a silicate of alkali metals, ammonium or organic bases and an alkali-soluble inorganic compound at the same time to a dispersion solution having pH 9 or above in which seed particles are dispersed, and growing composite oxide particles each with the seed particle as a core without controlling the pH of this dispersion solution. There is no specific restriction concerning the seed particles, so that, for instance, inorganic oxide such as $SiO_2$, $Al_2$, $O_3$, $TiO_2$, or $ZrO_2$ or the like, or a sol of the composite oxide comprising these inorganic oxides may be used.

It is preferable to use the composite oxide particles obtained according to the manufacturing method described above because a pore diameter inside the particle can be made larger thereby. Even if the seed particles are used, distribution of the particle size becomes uniform by growing the particles therein, and a form of the particle becomes a spheric one, so that the granurality distribution of the seed particles is not required to be previously adjusted to a uniform level, and also the form of the particle is not necessarily required to be a spheric one in the stage.

An average diameter of the seed particles is 500 nm or less, preferably especially 300 nm or less, and more preferably 100 nm or less. When the diameter thereof is more than 500 nm, the dispersion in the visible light area becomes larger, so that, if the sol adjusted with this seed particles is contained in the film, the transparency thereof becomes worse. The colloidal particles used in the present invention have pores with the large diameter as described above, and the resin goes into inside of pores of the particles, whereby the pores and the resin are combined with each other, which generates the specific characteristics of the colloidal particles that the refraction index of the particle itself becomes gradually closer to that of the resin in the outer side of each of the particles.

The composite oxide sol obtained according to any of the manufacturing methods described above comprises colloidal particles each with a network structure in which silicon and an inorganic oxide element other than silicon are bonded through oxygen, and it is possible to recognize that silicon and an inorganic oxide other than silicon are bonded each other, by measuring it with $^{29}Si$—NMR. Also, by measuring with the FT—IR, it is possible to recognize that there is little absorption near the wave number 1210 $cm^{-1}$ due to the Si—O—Si bond, and that silicon and an inorganic oxide other than silicon are bonded. This type of colloidal particles satisfy the expression of inequality [I] and the colloidal particles described above have high porosity.

It is possible to obtain colloidal particles having more pores therein and a large specific surface area by removing at least a part of elements other than silicon or oxygen selectively from the porous colloidal particles of composite oxide described above. As a concrete method of removing the element, there are some methods in which elements in the composite oxide are dissolved and removed with mineral acid or organic acid, or the elements are contacted with a cation exchange resin and are subjected to cation exchange removement. However, if they are removed excessively, the strength of the colloidal particles is weakened, and eventually the particles can not maintain the form. Accordingly, it is desirable that the final composite ratio (a mole ratio) of silica to the inorganic oxide is approximately 1000 or less.

It should be noted that the colloidal particles of composite oxide described above contain a large amount of alkali elements and/or alkaline earth elements, but a part of the elements can be substituted for other metals or nonmetal elements. As a concrete method of substituting the elements, there can be enumerated several methods in which the alkali elements and/or the alkaline earth elements contained in the colloidal particles are removed with mineral acids, organic acids, or cation exchange resins, and an element to be exchanged is introduced, or a salt of the element to be exchanged to the colloidal solution is added to ion-exchange. There is no particular restriction to the elements to be exchanged, but elements such as Be, Mg, Ca,Sr, Ba, Zr, Zn, and Al are extremely preferable because compatibility with the resin is improved when any of the elements is added to the resin.

The composite oxide sol obtained by the manufacturing method described above can be changed to an organosol by exchanging water as a dispersion medium with an organic solvent by the known method such as vacuum distillation method or ultrafiltration method. As an organic solvent, for instance, a solvent such as alcohol, glycol, ester, ketone, and a aromatic solvent or the like can be used, and more specifically the organic solvent such as methanol, ethanol, propanol, ethylene glycol, propylene glycol, glycerol, acetone, methyl ethyl ketone, propylene glycol mono methyl ether, ethyl cellosolve, dimethyl formamide, dimethyl sulfoxide, and N-methyl-2-pyrrolidone or the like can be enumerated. Also, by processing the surface of the colloidal particle with various kinds of surface modifier, the compatibility with the resin can further be improved. The surface modifier includes, for instance, an alcoxide compound such as tetraethoxy silane, triisopropoxy aluminum; a coupling agent such as a silane coupling agent and a titanium coupling agent; a low molecular or a high molecular surface-active agent such as a nonionic base, a cationic base, and an anionic base; and metal soap salt or the like such as metal salt of fatty acid and metal salt of naphthenic acid.

In the present invention, there is no particular restriction to a method for adding the composite oxide sol to the thermoplastic resin, so that any of well known methods can be employed at any of steps in the manufacturing process of a thermoplastic resin film. For instance, a method of mixing the sol into polymer with a molding machine such as a vent-type molding machine, or a method of mixing the sol to polymer during the polymerization step can be employed for this purpose. Especially, the method of adding the sol thereto during the process for polymerization is preferable because it insures excellent dispersion of the sol in the polymer. As the method of adding the sol to the polymer during the process for polymerization described above, for instance, condensation polymerization may be executed by adding the composite oxide sol with ethylene glycol as a dispersion medium to a polyester reaction system, so that the sol may be added thereto at any point of time just in the polyester manufacturing process from just before the reaction for ester exchange or esterification up to the initial stage of the reaction for condensation polymerization.

As a method of manufacturing the thermoplastic resin, any of the well-known methods can be employed. For instance, as a method of manufacturing polyester, any given manufacturing method such as the so-called direct polymerization method in which aromatic dicarboxylic acid and glycol are directly reacted to each other, the so-called ester exchange method in which dimethyl ester of aromatic dicarboxylic acid and glycol are reacted to each other can be employed. Also it is preferable to employ the method in which a part or all of the catalysts used for polyester synthesys is deposited in the reaction process is preferable together with other methods as described above. As the method described above, any of well-known methods such as, for instance, the method disclosed in Japanese Patent Laid-Open Publication No.161025/1989 can be employed.

There is no particular restriction to the method of elongating a thermoplastic resin film, so that any of the well-know methods can be employed. For instance, a film can be obtained by melting and extruding a resin into a sheet stage and then subjecting the sheet to uniaxial or biaxial elongation. As a method of elongating the sheet material (into a thin film), any of the well-know methods including the successive or simultaneous stretching method, tubing method, zone stretching method, inflation method, T-die method, casting method, and dispersion solution casting method can be employed. Also a temperature for elongating near a temperature for crystal dispersion of resin or a temperature at which the resin shifts to a glass state is preferable because a film with better molecular orientation can generally be obtained when the elongation of the film is executed at the temperature. When elongation is executed at the temperature near a melting point, molecular orientation hardly occurs, so that a film with no molecular orientation can be obtained. It should be noted that either films with molecular orientation or those without molecular orientation may be employed as the thermoplastic resin film but the film with molecular orientation is especially preferable because such factors as elastic modulus and mechanical strength increase generally in accordance with increase of the molecular orientation degree. As a elongation factor, about 2 to 10 times in each direction is preferable, and then the film may further be drawn by about 1.01 to 5 times in the vertical and/or the horizontal direction. The film obtained as described above generates therein a shrinking force like elasticity of rubber when the temperature is higher than the glass-transition temperature, and shrinks thermally. To prevent this thermal shrinkage described above, the film is fixed thermally to stabilize the structure of the film, whereby it is possible to obtain a film which is highly resistant against heat and excellent in heat stability. A method of the thermal stabilizing includes, for instance, a method in which a film is passed through between heaters and the zone heat processing method. Thickness of the film can be adjusted to a value in a range from 0.5 to 500 $\mu$m generally, if necessary. It should be noted that, although either a uniaxial elongation film or a biaxial elongation film may be employed as the thermoplastic resin film, the biaxial elongation film is more preferable.

The thermoplastic resin film with orientation and/or without orientation obtained as described above is subjected to various kinds of post treatment by any of the well-known methods according to each application, and the film can be used as a magnetic tape, a capacitor, a photographic film, an adhesive tape, a stamping foil, a material for electric insulation, a package material, a hard disk, a flexible disk, a printed circuit board, an engraved material, a printed material, a conductive film, and a building material or the like.

Next detailed description is made for the present invention with reference to embodiments thereof, and it should be noted that the embodiments are provided only as examples thereof. In a case where the thermoplastic resin film according to the present invention is manufactured, thermoplastic resin or fine particles of composite oxide other than those used in the embodiments described below can be used. For this reason, the present invention should not be interpreted only in the range limited by the embodiments. The scope of the present invention is defined by claims of the present invention and is not restricted by any portion of description in the specification. Also any alteration or change constituting an equivalent claims shall be regarded as within the scope of the present invention.

[Manufacture of Fine Particles of Composite Oxide]

EXAMPLE 1

5 weight % of sodium hydroxide aqueous solution was added to a mixed solution of 32 g of a commercial silica sol (manufactured by Catalysts & Chemicals Industries; Cataloid SI-120P; density of silica: 20 weight %, average diameter of particles: 120 nm) and 608 g of pure water, and was adjusted to one having a pH 12.5, and heated to a temperature of 80° C. Then, 20 hours was required for adding 2565 g of sodium silicate aqueous solution having a concentration of 1.5 weight % as $SiO_2$ and 5596 g of sodium aluminate aqueous solution having a concentration of 0.5 weight % as $Al_2O_3$ simultaneously to this mother liquor. The temperature of the reaction solution was kept at 80° C. during the period of time described above. After addition thereof, the reaction solution was agitated for 1 hour, cooled down to the room temperature, and the obtained colloidal aqueous solution of composite oxide was washed with an ultrafilter (manufactured by Asahi Kasei Kogyo, SIP-1013) to prepare a colloidal aqueous solution having a concentration of 20 weight % as the composite oxide.

The average diameter of the colloidal particles dispersed in this colloidal solution was 310 nm, the specific surface area of the colloidal particles was 12.1 m$^2$/g, and the average pore diameter of colloidal particles was 12 nm.

Then, ethylene glycol was added to the colloidal aqueous solution and, the solvent was substituted at 100° C. by a rotary evaporator, and a composite oxide sol dispersed 20 weight % of $SiO_2$—$Al_2O_3$—$Na_2O$ in ethylene glycol as dispersion medium was obtained.

The composition of this colloidal particles was as follows; $SiO_2$: 47.5 weight %, $Al_2O_3$ 32.5 weight %, and $Na_2O$: 20.0 weight %.

The result of measurement of the colloidal particles by the FT—IR showed that an absorption peak corresponding to Si—O—Si bond appearing on the wave number 1210 cm$^{-1}$ is shifted to the position adjacent to the wave number 930 cm$^{-1}$, and also the result of measurement thereof by the $^{29}$Si—NMR showed that a peak of silicon coordinated with four pieces of Si provided therein appears on a chemical shift of –110PPM, while a peak of the chemical shift of –110PPM is small and a high peak thereof appears at a position adjacent to –99PPM of silicon with Al provided therein.

Table 1 shows conditions for preparation of the composite oxide sol obtained as described above. Table 2 and Table 3 show a result obtained by measuring properties of the composite oxide sol by the method as described below (1) Average Diameter of Colloidal Particles A colloidal solution was diluted with distilled water, and the particle size and its distribution were determined a dynamic light scattering method on a Hiac/Royco NICOMP-370.

(2) Variation Coefficient SD of Colloidal Particles(%)

It was measured by the same device described above. Herein SD (%)=(a standard deviation/an average diameter of particles)×100.

(3) Specific Surface Area of Colloidal Particles

The colloidal aqueous solution was dried by a freeze dryer, and the sample was dried for 20 hours at 110° C. A specific surface area was determined by a nitrogen adsorption method (BET method) on a Counter Chrome-Multisorb 12.

(4) True Specific Gravity of Colloidal Particles

A specific gravity of the colloidal aqueous solution containing 20 weight % of composite oxide was measured according to JIS Z 8804-1960, and true specific gravity was obtained by converting a density of solid materials of the colloidal aqueous solution.

(5) Composition of Colloidal Particles

A composition of the colloidal particles in the colloidal aqueous solution was measured by a plasma emission spectroscopic analysis on a Seiko Denshi SPs 1200 A.

(6) Pore Volume in Colloidal Particles

The colloidal aqueous solution was dried by a freeze dryer, and the sample was dried for 20 hours at 110° C. Pore volume in the sample was determined by a BET method on a Counter Chrome Totosorb 6.

(7) Average Pore Diameter of Colloidal Particles

A sample colloidal solution containing 40 weight % of composite oxide prepared by a rotary evaporator. Average pore diameter was measured by a differential thermal analysis described above.

(8) Refraction Index of Colloidal Particles

The colloidal aqueous solution was measured by a refraction index measuring device (produced by Atago, RX-1000), and the refraction index of fine particles was obtained by converting a density of solid materials contained therein.

(9) Oil Adsorption Rate of Colloidal Particles

The colloidal aqueous solution was dried by a freeze dryer, and the sample dried for 20 hours at 110° C. was measured with linseed oil according to JIS K 5101-21.

(10) Ignition Loss of Colloidal Particles

The colloidal aqueous solution was dried by a freeze dryer, and the sample dried for 20 hours at 110° C. was calcined for one hour at 1000° C. for obtaining the loss of weight.

(11) Crystallization of Colloidal Particles

The colloidal aqueous solution was dried by a freeze dryer, and then a crystal form of the sample dried for 20 hours at 110° C. was characterized with a high output X-ray diffracting device (produced by Rigaku Denki, RINT-1400).

(12) Infrared Absorption Characteristics of Colloidal Particles

The colloidal aqueous solution was dried by a freeze dryer, and the sample was dried for 20 hours at 110° C. Infrared spectra were recorded on a JEOL JIR-5500.

(13) Structural Characteristics of Colloidal Particles

The colloidal aqueous solution was dried by a freeze dryer, and the sample was dried for 20 hours at 110° C. The $^{29}$Si-NMR spectrum was recorded on a JEOL JNM-EX 270.

EXAMPLE 2

5 weight % sodium hydroxide aqueous solution was added to a mixed solution of 25 g of a commercial silica sol (manufactured by Catalysts & Chemicals industries; Cataloid Si-45P; density of silica: 40 weight %, average diameter of particles: 45 nm) and 975 g of pure water, and was adjusted to one having a pH 12.5, and heated to a temperature of 80° C. Then, 20 hours was required for adding 9800 g of sodium silicate aqueous solution having a concentration of 3 weight % as $SiO_2$ and 9800 g of zirconia carbonate ammonium aqueous solution having a concentration of 2 weight % as $ZrO_2$ simultaneously to this mother liquor. Then, like that in Example 1, a composite oxide sol dispersed 20 weight % of $SiO_2$—$ZrO_2$—$Na_2O$ in ethylene glycol as dispersion medium was obtained.

The composition of this colloidal particles was as follows; $SiO_2$: 49.5 weight %, $ZrO_2$: 33.5 weight %, and $Na_2O$: 17.0 weight %.

EXAMPLE 3

5 weight % potassium hydroxide aqueous solution was added to a mixed solution of 62.5 g of a commercial silica sol (manufactured by Catalysts & Chemicals Industries; Cataloid SI-160P; density of silica: 20 weight %, average diameter of particles: 160 nm) and 1187.5 g of pure water, and was adjusted to one having a pH 12.5, and heated to a temperature of 60° C. Then, 25 hours was required for adding 9807 g of potassium silicate aqueous solution having a concentration of 3 weight % as $SiO_2$ and 6538 g of ammonium zinc acid aqueous solution having a concentration of 1 weight % as ZnO simultaneously to this mother liquor. After addition thereof, the reaction solution was agitated for 1 hour, cooled down to the room temperature, and the colloidal aqueous solution of composite oxide was washed with an ultrafilter (manufactured by Asahi Kasei Kogyo, SIP-1013) to prepare a colloidal aqueous solution having a concentration of 10 weight % as the composite oxide. The composition of this colloidal particles was as follows; $SiO_2$: 60 weight %, ZnO: 22 weight %, and $K_2O$: 18 weight %.

Next, strong acid cation exchange regins (manufactured by Mitsubishi Kasei, DAIAION,SK1B) were gradually added to the colloidal aqueous solution until the pH of the solution fell to 8, and the contacted regins were removed. Then, like that in Example 1, a composite oxide sol dispersed 20 weight % of $SiO_2$—ZnO—$K_2O$ in ethylene glycol as dispersion medium was obtained. The composition of this colloidal particles was as follows; $SiO_2$: 73 weight %, ZnO: 19.5 weight %, and $K_2O$: 7.5 weight %.

EXAMPLE 4

1800 g of sodium silicate aqueous solution having a concentration of 2 weight % as $SiO_2$ and 2400 g of sodium aluminate aqueous solution having a concentration of 0.5 weight % as $Al_2O_3$ are added simultaneously in 5 hours, to 400 g of sodium hydroxide aqueous solution having a pH of 12.5 and a concentration of 0.1 weight % which was heated to a temperature of 80° C. Then, like that in Example 1, a composite oxide sol dispersed 20 weight % of $SiO_2$—$Al_2O_3$—$Na_2O$ in ethylene glycol as dispersion medium was obtained. The composition of this colloidal particles was as follows; $SiO_2$: 62.5 weight %, $Al_2O_3$: 23.5 weight %, and $Na_2O$: 14.0 weight %.

EXAMPLE 5

5 weight % sodium hydroxide aqueous solution was added to the mixed solution of 50 g of $SiO_2$—$Al_2O_3$—$Na_2O$ sol (density of solid: 20 weight %) obtained in Example 4 and 350 g of pure water to be adjusted pH 11.5, and the mixed solution was heated to 90° C. And 20 hours was required for adding 15600 g of sodium silicate aqueous solution having a concentration of 1 weight % as $SiO_2$ and 11540 g of sodium aluminate aqueous solution having a concentration of 0.5 weight % as $Al_2O_3$ simultaneously to this mother liquor. Then, like that in Example 1, a composite oxide sol dispersed 20 weight % of $SiO_2$—$Al_2O_3$—$Na_2O$ in ethylene glycol as dispersion medium was obtained. The composition of this colloidal particles was as follows; $SiO_2$: 58.5 weight %, $Al_2O_3$: 26 weight %, and $Na_2O$: 15.5 weight %.

EXAMPLE 6

4950 g of potassium silicate aqueous solution having a concentration of 2 weight % as $SiO_2$ and 707 g of potassium antimony acid aqueous solution having a concentration of 3.5 weight % as $Sb_2O_5$ are added simultaneously in 2 hours, to 1000 g of potassium silicate aqueous solution having a concentration of 1 weight % as $SiO_2$ which was heated to 90° C. Then, a colloidal solution having a concentration of 20 weight % as oxide was obtained by washing and condensing as the same manner in Example 1. The average diameter of the colloidal particles dispersed in this colloidal solution was 28 nm. Then, 28 hours was required for adding 88910 g of potassium silicate aqueous solution having a concentration of 2 weight % as $SiO_2$ and 12700 g of potassium antimony acid aqueous solution having a concentration of 3.5 weight % as $Sb_2O_5$ simultaneously to this mother liquor.

Then, like that in Example 1, a composite oxide sol dispersed 20 weight % of $SiO_2$—$Sb_2O_5$—$K_2O$ in ethylene glycol as dispersion medium was obtained. The composition of this colloidal particles was as follows; $SiO_2$: 75 weight %, $Sb_2O_5$: 20 weight %, and $K_2O$: 5 weight %.

EXAMPLE 7

5 weight % sodium hydroxide aqueous solution was added to the mixed solution of 50 g Of $SiO_2$—$Sb_2O_5$—$K_2O$ sol (density of solid: 20 weight %) obtained in Example 6 and 950 g of pure water to be adjusted pH 12.5, and the mixed solution was heated to 95° C. And 18 hours was required for adding 12570 g of sodium silicate aqueous solution having a concentration of 1 weight % as $SiO_2$ and 4190 g of di-n-butoxy-bis (triethanolaminate) titanium aqueous solution having a concentration of 2 weight % as $TiO_2$ simultaneously to this mother liquor. The temperature of the reaction solution was kept at 95° C. during the period of time described above. After addition thereof, the reaction solution was agitated for 1 hour, cooled down to the room temperature, and the colloidal aqueous solution of composite oxide was washed with an ultrafilter (manufactured by Asahi Kasei Kogyo, SIP-1013) to obtain a composite, oxide sol dispersed 20 weight % of $SiO_2$—$TiO_2$—$Na_2O$ in water as dispersion medium. The composition of this colloidal particles was as follows; $SiO_2$: 54.5 weight %, $TiO_2$: 35.5 weight %, and $Na_2O$: 10 weight %.

EXAMPLE 8

While 6000 g of calcium chloride aqueous solution having a concentration of 0.01 weight % was gradually added to a mixed solution of 300 g of the composite oxide sol of $SiO_2$—$Al_2O_3$—$Na_2O$ obtained in Example 1 and 11700 g of pure water, agitating the latter, Na ion and Ca ion contained in the composite oxide are ion-exchanged with the ultrafilter (produced by Asahi Kasei Kogyo, SIP-1013). Then, the obtained mixture was washed with 1500 g of pure water to obtain a colloidal aqueous solution having a concentration at 10 weight % as the oxide by condensing, and further like that in Example 1, the solvent was substituted with ethylene glycol, and thus a composite oxide sol dispersed 20 weight % of $SiO_2$—$Al_2O_3$—CaO in ethylene glycol as dispersion medium was obtained. The composition of this colloidal particles was as follows; $SiO_2$: 48 weight %, $Al_2O_3$: 33 weight %, CaO: 15 weight %, and $Na_2O$: 4 weight %.

TABLE 1

| Example No. | Seed particles Component | Avr. diameter (nm) | Prep. condition Temp. (° C.) | Comp. ratio (mol ratio) |
|---|---|---|---|---|
| 1 | $SiO_2$ | 120 | 80 | 2.3 |
| 2 | $SiO_2$ | 45 | 80 | 3.1 |
| 3 | $SiO_2$ | 170 | 60 | 4.1 |
| 4 | — | — | 80 | 5.1 |
| 5 | $SiO_2$—$Al_2O_3$—$Na_2O$ | 52 | 90 | 5.1 |
| 6 | — | — | 95 | 19.5 |
| 7 | $SiO_2$—$Sb_2O_5$—$K_2O$ | 100 | 95 | 4.2 |
| 8 | $SiO_2$—$Al_2O_3$—$Na_2O$ | 290 | room | 2.3 |

TABLE 2

| Example No. | Component | Avr. diameter (Dp) (nm) | CV (%) | Surface area(S) ($m^2$/g) | Spec. gravity | SXDpXSG |
|---|---|---|---|---|---|---|
| 1 | $SiO_2$—$Al_2O_3$—$Na_2O$ | 310 | 19 | 12.1 | 2.87 | 10765 |
| 2 | $SiO_2$—$ZrO_2$—$Na_2O$ | 170 | 18 | 21.6 | 3.80 | 13954 |
| 3 | $SiO_2$—ZnO—$K_2O$ | 500 | 20 | 8.7 | 3.62 | 15747 |
| 4 | $SiO_2$—$Al_2O_3$—$Na_2O$ | 52 | 38 | 121.0 | 2.84 | 17869 |
| 5 | $SiO_2$—$Al_2O_3$—$Na_2O$ | 120 | 15 | 54.9 | 2.86 | 18842 |
| 6 | $SiO_2$—$Sb_2O_5$—$K_2O$ | 100 | 11 | 76.2 | 3.40 | 25908 |
| 7 | $SiO_2$—$TiO_2$—$Na_2O$ | 290 | 24 | 33.2 | 3.37 | 32446 |
| 8 | $SiO_2$—$Al_2O_3$—$Na_2O$—CaO | 320 | 10 | 12.5 | 3.25 | 13000 |
| Comp. 1 | $SiO_2$ | 500 | 18 | 5.5 | 2.21 | 6077 |

TABLE 3

| Example No. | Crystal form | Ignition loss (wt %) | Pore volume (ml/g) | Pore diameter (nm) | Oil adsorp. (ml/100 g) | Refract. index |
|---|---|---|---|---|---|---|
| 1 | amorphous | 18 | 0.31 | 12 | 28 | 1.54 |
| 2 | amorphous | 20 | 0.34 | 20 | 37 | 1.65 |
| 3 | amorphous | 17 | 0.39 | 37 | 35 | 1.59 |
| 4 | amorphous | 28 | 0.40 | 7 | 69 | 1.51 |
| 5 | amorphous | 23 | 0.43 | 10 | 68 | 1.52 |
| 6 | amorphous | 30 | 0.38 | 18 | 73 | 1.54 |
| 7 | amorphous | 18 | 0.29 | 54 | 38 | 1.65 |
| 8 | amorphous | 17 | 0.30 | 11 | 29 | 1.57 |
| Comp. 1 | amorphous | 3 | 0.10 | — | 8 | 1.45 |

[Manufacture of a Thermoplastic Resin Film]
Embodiment 1

100 parts of dimethyl terephthalate, 70 parts of ethylene glycol, and 0.01 part of calcium asetate as an ester interchange catalyst, and 0.03 part of antimony of trioxide as a polycondensation catalyst were added, and the resultant mixture was heated up to 220° C. to remove theoretical methanol, and then the ester interchange reaction was finished. Then, 0.04 part of trimethyl phosphate and 0.1 part of composite oxide sol dispersed fine $SiO_2$—$Al_2O_3$—$Na_2O$ particles in ethylene glycol as a dispersion medium manufactured in the example 1 were added to the reaction system. Then, the pressure inside of the reaction system was reduced to 1 mm Hg, a polycondensation reaction was executed at the temperature of 290° C. for 4 hours, and ethylene glycol was removed, whereby polyester with the intrinsic viscosity of 0.62 was obtained. The intrinsic viscosity was measured by a Ostwald viscometer at the temperature of 25° C. by dissolving the polyester in the mixed solvent of phenol and tetrachloroethane. The obtained polyester was formed to a sheet by an extruding machine under the temperature in a range from 290 to 300° C., and the sheet was drawn to 3.5 times larger as compared to the original size in the vertical direction at 90° C., then the sheet was further drawn to 3.5 times larger as compared to the original size in the horizontal direction at 130° C., which was subjected to heat processing at 210° C., and a polyester film with a thickness of 13 g m containing the colloidal particles of composite oxide could be obtained.

Measuring hazing value of the obtained film by a haze meter (produced by Suga Shikenki) according to ASTM-D-1003-59, the hazing value of this film was 0.7%. Observation of this film by a transmitting type electron microscope showed that there were an extremely small number of voids near the interface between the film and the colloidal particles and the adhesion thereof to the polyester was sufficiently strong. Also, any flock of particles was not observed, and the dispersion state of the particles were good. Furthermore, a result of measurement of the static friction coefficient by a slip tester showed that it was not, more than 1.0, so that the excellent slipperiness was demonstrated.

Table 4 shows a result of measurement and observation of the properties of the film obtained as described above according to the following method.
(1) Hazing Value of Film It was measured by a haze meter based on an integrating sphere system (produced by Suga Shikenki) according to the ASTM-D-1003-59.
(2) Slipperiness of Film The static friction coefficient($\mu S$) was measured by a slip tester (produced by Toyo Tester) according to the ASTM-D-1894B.
(3) Roughness of the Surface: Ra($\mu$m)

The measurement was performed under the conditions of a cut-off value 0.08 mm and a length 0.5 mm by a contact probe method (produced by Tokyo Seimitsu) according to the JIS-B- 8601.
(4) Voids A small piece of the film was fixed and molded with an epoxy resin, and an ultra-thin piece thereof having a thickness of about 200 Å was formed by a microtome. With this sample, the cross-sectional surface of the colloidal particles in the film was observed by a transmission type of electron microscope (produced by Hitach Seisakusho), a longitudinal diameter (A) of each particle and a longitudinal diameter (B) of each of voids in at least 100 pieces of particles were measured, and a ratio (B/A) of the longitudinal diameters was obtained. It should be noted that meanings indicated by the reference codes in table 4 are as follows:

⊚... B/A is from 1.0 to 1.05, and generation of voids therein is not recognized, or there are an extremely small number of voids therein.

○... B/A is from 1.05 to 1.2, and there are a small number of voids generated therein.

Δ... B/A is from 1.2 to 1.5, and there are a large number of voids generated therein.

X... B/A is from 1.5 or more, and there are an extremely large number of voids generated therein.

(5) Dispersion of Colloidal Particles

The dispersion of colloidal particles was observed by the transmission type of electron microscope according to the same method described above. It should be noted that meanings indicated by the reference codes in table 4 are as follows:

○... Flocks are hardly observed.

Δ... A small number of flocks are observed.

X... An extremely large number of flocks are observed.

Embodiment 2

Using 0.2 part of composite oxide sol of $SiO_2$—$ZrO_2$—$Na_2O$ obtained in Example 2, a polyester containing colloidal particles of composite oxide and a polyester film were obtained as the same manner in Embodiment 1.

The obtained film was excellent in the slipperiness, the wear resistance, and the transparency, there were an extremely small number of voids near the interface between the film and the colloidal particles, and the adhension thereof to the polyester was also excellent.

Embodiment 3

Using 0.05 part of composite oxide sol of $SiO_2$—$ZnO$—$K_2O$ obtained in Example 3 and 0.1 part of composite oxide sol of $SiO_2$—$ZrO_2$—$Na_2O$ obtained in Example 2, a polyester containing colloidal particles of composite oxide and a polyester film were obtained as the same manner in Embodiment 1.

The obtained film was excellent in the slipperiness, the wear resistance, and the transparency, there were an extremely small number of voids near the interface between the film and the colloidal particles, and the adhension thereof to the polyester was also excellent.

Embodiment 4

Using 0.4 part of composite oxide sol of $SiO_2$—$Al_2O_3$—$Na_2O$ obtained in Example 4, the procedures were carried out in the same manner as described in Embodiment 1 except that 126 parts of dimethyl-2,6-naphtalate instead of dimethyl terephthalate used in Embodiment 1, and a polyester with the intrinsic viscosity of 0.65 containing colloidal particles of composite oxide was obtained.

The obtained polyester was formed to a sheet by an extruding machine at 295° C., and the sheet was drawn to 2.7 times larger as compared to the original size in the vertical direction at 140° C., then the sheet was further drawn to 4.5 times larger as compared to the original size in the horizontal direction at 135° C., which was subjected to heat processing at 210° C. Next the sheet was drawn to 1.5 times larger as compared to the above size in the vertical direction at 150° C., then the sheet was further drawn to 1.1 times larger as compared to the above size in the horizontal direction at 235° C., and a polyester film with a thickness of 4 μm containing the colloidal particles of composite oxide could be obtained.

The obtained film was excellent in the slipperiness, the wear resistance, and the transparency, there were an extremely small number of voids near the interface between the film and the colloidal particles, and the adhension thereof to the polyester was also excellent.

Embodiment 5

Using 0.3 part of composite oxide sol of $SiO_2$—$Al_2O_3$—$Na_2O$ obtained in Example 5, a polyester containing colloidal particles of composite oxide and a polyester film were obtained as the same manner in Embodiment 4.

The obtained film was excellent in the slipperiness, the wear resistance, and the transparency, there were an extremely small number of voids near the interface between the film and the colloidal particles, and the adhension thereof to the polyester was also excellent.

Embodiment 6

Using 0.3 part of composite oxide sol of $SiO_2$—$Sb_2O_5$—$K_2O$ obtained in Example 6, a polyester with the intrinsic viscosity of 0.65 containing colloidal particles of composite oxide was obtained as the same manner in Embodiment 5. The obtained polyester was formed to a sheet by an extruding machine at 295° C., and the sheet was drawn to 2.5 times larger as compared to the original size in the vertical direction at 140° C., then the sheet was further drawn to 4.2 times larger as compared to the original size in the horizontal direction at 135° C., which was subjected to heat processing at 210° C., and a polyester film with a thickness of 9 μm containing the colloidal particles of composite oxide could be obtained.

The obtained film was excellent in the slipperiness, the wear resistance, and the transparency, there were an extremely small number of voids near the interface between the film and the colloidal particles, and the adhension thereof to the polyester was also excellent.

Embodiment 7

0.2 part of composite oxide sol of $SiO_2$—$TiO_2$—$Na_2O$ obtained in Example 7 and 100 parts of ε-caprolactam were put into an autoclave, and the temperature was gradually increased while they were agitated. Then it was heated and agitated for further 1 hour at 260° C. under the normal pressure to proceed the polycondensation reaction, and polyamide with a relative viscosity of 2.60 was; obtained. This polyamide was melted and extruded at 290° C. into a form of sheet, and then the sheet was drawn to 3.5 times larger as compared to the original size in the vertical direction at 75° C., and then drawn to 3.6 times larger as compared to the original size in the horizontal direction at 90° C., then subjected to heat processing at 200° C., and a polyamide film containing the colloidal particles of composite oxide having a thickness of 15 μm was obtained. The obtained film was excellent in the slipperiness, the wear resistance, and the transparency, there were an extremely small number of voids near the interface between the film and the colloidal particles, and the adhension thereof to the polyamide was also excellent.

Embodiment 8

Using 0.15 part of composite oxide sol of $SiO_2$—$Al_2O_3$—$CaO$ obtained in Example 8, a polyester containing colloidal particles of composite oxide and a polyester film were obtained as the same manner in Embodiment 6.

The obtained film was excellent in the slipperiness, the wear resistance, and the transparency, there were an extremely small number of voids near the interface between the film and the colloidal particles, and the adhension thereof to the polyester was also excellent.

Comparative Embodiment 1

The procedures were carried out in the same manner as described in Embodiment 1 except that 0.05 part of commercial sol dispersed silica particles in ethylene glycol as a dispersion medium (manufactured by Catalysts & Chemicals Industries; OSCAL-2725; density of silica: 20 weight %, average diameter of particles: 500 nm) instead of SiO$_2$—Al$_2$O$_3$—Na$_2$O sol used in Embodiment 1, and a polyester containing colloidal silica particles and a polyester film were obtained.

The obtained film was poor in the slipperiness, the wear resistance, and the transparency, there were an extremely large number of voids near the interface between the film and the colloidal particles, and the adhension thereof to the polyester was also insufficient.

TABLE 4

| Embodiment No. | Film | Content (wt %) | Hazing value (%) | Slipperiness (μS) | Roughness (μm) | Dispersion | Voids |
|---|---|---|---|---|---|---|---|
| 1 | PET | 0.1 | 0.6 | 1.3 | 0.004 | ○ | ⊙ |
| 2 | PET | 0.2 | 0.6 | 1.5 | 0.002 | ○ | ⊙ |
| 3 | PET | 0.05 | 0.4 | 0.9 | 0.007 | ○ | ⊙ |
| 4 | PEN | 0.4 | 0.1 | 1.9 | 0.001 | Δ | ⊙ |
| 5 | PEN | 0.2 | 0.6 | 1.6 | 0.002 | ○ | ⊙ |
| 6 | PEN | 0.3 | 0.5 | 1.6 | 0.001 | ○ | ⊙ |
| 7 | P A | 0.2 | 0.7 | 1.3 | 0.004 | ○ | ⊙ |
| 8 | PEN | 0.15 | 0.5 | 1.3 | 0.004 | ○ | ⊙ |
| Comp. 1 | PET | 0.05 | 4.2 | 1.1 | 0.007 | Δ | × |

INDUSTRIAL APPLICABILITY

In the thermoplastic resin film according to the present invention, the difference between refraction index of the contained the colloidal particles of composite oxide and that of the thermoplastic resin is small, and the film has also the peculiar characteristics that the resin is present even inside pores of the colloidal particles and the particles have a graduated refraction index, so that hazing value of the film is low and the film is excellent in the transparency. As the film is also excellent in the adhesiveness to the colloidal particles and the resin with high compatibility therewith, so that few voids are generated, which insures the excellent slipperiness and the high wear resistance. Accordingly, it is suited to be used as a material for such products as a magnetic tape, a capacitor, a photographic film, an adhesive tape, or as a material for electrical insulation, a packaging material, as a material for such products as a hard disk, a flexible disk, a printed circuit board, or as a material for printing, a conductive film, and as a material for construction or the like.

The method of manufacturing the thermoplastic resin film according to the present invention provides a thermoplastic resin film with orientation and/or without orientation which is excellent in the transparency, the slipperiness, and the wear resistance, and it is not required to adjust the pH in the manufacturing processes for the composite oxide sol, which makes the manufacturing work of the sol simple, and also the colloidal particles of composite oxide can be added in a sol state to the thermoplastic resin, which simplifies the whole manufacturing process.

We claim:

1. A thermoplastic resin film containing 0.05 to 0.5 weight % of fine particles of composite oxide comprising silica, alkali metal oxide and at least one inorganic oxide other than silica or alkali metal oxide, which satisfies the following expression of inequality (I):

$$S \geq 10{,}000/(Dp * SG) \tag{I}$$

wherein S indicates the specific surface area (m$^2$/g) of the fine particles of composite oxide, Dp indicates the average diameter (nm) of the fine particles, and SG indicates the true specific gravity thereof.

2. The thermoplastic resin film according to claim 1, wherein said thermoplastic resin film is a polyester film.

3. The thermoplastic resin film according to claim 1, wherein hazing value of said thermoplastic resin film is 5% or less.

4. The thermoplastic resin film according to claim 1, wherein the difference of the refractive index between the film and the fine particles of composite oxide contained therein is in a range of ±0.10.

* * * * *